United States Patent [19]

Hard

[11] Patent Number: 4,722,756
[45] Date of Patent: Feb. 2, 1988

[54] METHOD FOR DEOXIDIZING TANTALUM MATERIAL

[75] Inventor: Robert A. Hard, Oley, Pa.

[73] Assignee: Cabot Corp, Boston, Mass.

[21] Appl. No.: 20,111

[22] Filed: Feb. 27, 1987

[51] Int. Cl.⁴ .................................................. C21D 1/00
[52] U.S. Cl. .............................. 148/126.1; 75/0.5 B; 75/0.5 BB; 148/13.1; 148/133
[58] Field of Search ................... 148/126.1, 13.1, 133, 148/DIG. 14; 75/0.5 B, 0.5 BB

[56] References Cited

U.S. PATENT DOCUMENTS

| | | | |
|---|---|---|---|
| 4,141,719 | 2/1979 | Hakko | 148/126 |
| 4,508,563 | 4/1985 | Bernard et al. | 75/0.5 BB |
| 4,555,268 | 11/1985 | Getz | 148/126.1 |

*Primary Examiner*—Stephen J. Lechert, Jr.
*Attorney, Agent, or Firm*—Robert J. Feltovic

[57] ABSTRACT

Disclosed is a process for the reduction of oxygen content in tantalum and/or columbium-containing material comprising heating the material under a hydrogen atmosphere in the presence of an oxygen-active metal.

7 Claims, No Drawings

METHOD FOR DEOXIDIZING TANTALUM MATERIAL

Tantalum capacitors typically are manufactured by compressing tantalum powder to form a pellet, sintering the pellet in a furnace to form a porous body, and then subjecting the body to anodization in a suitable electrolyte to form a continuous dieletric oxide film on the sintered body.

Development of tantalum powder suitable for capacitors has resulted from efforts by both capacitor producers and tantalum processors to delineate the characteristics required of tantalum powder in order for it to best serve in the production of quality capacitors. Such characteristics include surface area, purity, shrinkage, green strength, and flowability.

First of all, the powder should feature an adequate surface area, since the capacitance of tantalum powder is a function of surface area; the greater the surface area after sintering, the greater the specific capacitance.

Purity of the powder also is a critical consideration. Metallic and non-metallic contamination tend to degrade the dielectric. High sintering temperatures tend to remove some of the volatile contaminants; however, high temperatures reduce the net surface area and thus the capacitance of the capacitor. Minimizing the loss of surface area under sintering conditions is a requisite in order to maintain the capacitance of the tantalum powder.

The flowability of the tantalum powder and the green strength (mechanical strength of processed, unsintered powder) are critical parameters for the capacitor producer in order to accommodate efficient production. The flowability of the powder allows smooth die feeding in high speed pressing operations; green strength permits product handling and transport without excessive breakage.

As discussed above, the capacitance of a tantalum pellet is a direct function of the surface area of the sintered powder. Greater surface area can be achieved, of course, by increasing the grams of powder per pellet, but, cost considerations have dictated that development be focused on means to increase the surface area per gram of powder utilized. Since decreasing the particle size of the tantalum powder produces more surface area per unit of weight, effort has been extended into ways of making the tantalum particles smaller without introducing other adverse characteristics that often accompany size reduction. Three of the major deficiencies of very fine powder are poor flow characteristics, excessive oxygen content, and excessive loss of surface area on sintering.

For electrolytic capacitors, the oxygen concentration in the tantalum is critical. When the total oxygen content of porous tantalum pellets is above 3000 ppm, capacitors made from such pellets may have unsatisfactory life characteristics. Unfortunately tantalum powder has a great affinity for oxygen, and thus the processing steps which involve heating and subsequent exposure to air inevitably results in an increased concentration of oxygen. Electronic grade tantalum powder is normally heated under vacuum to partially agglomerate it. During this treatment it usually picks up a considerable amount of oxygen because the surface layer of oxide goes into solution in the metal. Formation of a new surface layer upon exposure to air then adds to the total oxygen content. During the later processing of these powders into anodes for capacitors, this oxygen may recrystallize as a surface oxide and contribute to voltage breakdown or high leakage current of the capacitor by shorting through the dielectric layer of amorphous oxide.

Since the amount of oxygen absorbed will be proportional to the surface area exposed, fine powders with high capacitance properties are even more susceptible to reaction with atmospheric oxygen. For that reason, the oxide content of fine-grained tantalum powders is naturally higher than that of coarser grain fractions. This is particularly true for agglomerated tantalum powders which are sintered together from especially fine individual particles. In this case, there takes place an additional adsorption of oxygen after the thermal agglomeration process and in consequence of a reactivation of the surface of the tantalum. Electrical properties of tantalum capacitors would be markedly improved if the oxygen content of the tantalum could be reduced before and/or after processing as capacitor anodes.

Alkaline earth metals, aluminum, yttrium, carbon, and tantalum carbide have all previously been mixed with tantalum powder in order to deoxygenate the tantalum. However, there are certain disadvantages to this technique. The alkaline earth metals, aluminum, and yttrium form refractory oxides which must be removed, e.g., by acid leaching, before the material is suitable for capacitors. The amount of carbon must be carefully controlled since residual carbon is also deleterious to capacitors even at levels as low as 50 ppm. Still other methods which have been proposed involve using a thiocyanate treatment or using a hydrocarbon or reducing atmosphere during some of the tantalum processing stages in order to prevent oxidation and thus keep the oxygen content low.

According to the present invention, oxygen is removed from tantalum and/or columbium materials by performing a heating operation in an atmospheric containing hydrogen gas in the presence of a more oxygen-active metal than tantalum. Any tantalum or columbium containing material may be effectively treated. Such tantalum and/or columbium materials typically may include tantalum and columbium metal or alloys in any form, as well as tantalum and columbium compounds, such as oxides or hydrides, and the like. In a preferred embodiment, the dissolution of oxygen in tantalum and/or columbium powder during standard heating operations, such as agglomerating or sintering, is prevented by conducting these operations under the conditions of the present invention. In another embodiment, oxygen can be removed from the tantalum and/or columbium powder that has been pressed into anodes by performing the sintering of the anodes in a hydrogen-containing atmosphere in the presence of an oxygen-active metal.

Suitable oxygen-active metals are selected from the group consisting of beryllium, calcium, cerium, hafnium, lathanum, lithium, praseodymium, scandium, thorium, titanium, uranium, vanadium, yttrium, zirconium, alloys thereof such as misch metal, mixtures thereof, and the like. Titanium and zirconium are preferred.

It is theorized that the hydrogen gas reacts with the tantalum and/or columbium oxide to form water vapor which then is "gettered" by the oxygen-active metal to form an active metal oxide and hydrogen. Such a reaction mechanism is exemplified by the following equations, where tantalum is shown as the metal being deoxidized and titanium is shown as a representative oxygen-active metal getter:

$$Ta_2O_5 + 5H_2 \rightarrow 5H_2O + 2Ta \quad (A)$$

$$H_2O + Ti \rightarrow TiO + H_2 \quad (B)$$

The active-metal getter need not be in physical contact with the tantalum material, but for best results, preferably is situated in close proximity to the tantalum. In order to present the highest surface area of getter metal, it is preferred to use getter metal in the form of sponge. However, the getter metal can be employed in any form, such as sheet, sponge, or powder material.

The heating treatment may be conducted at any temperature from about 900° to about 2400° C. (about 1173° K. to about 2673° K.); the gettering reaction is favored by increasing temperatures. A preferred temperature range is about 1100° to about 2000° C. (about 1373° to about 2273° K.). For best results, it is preferred that a getter metal be used that has a melting point below the temperature intended to be achieved in the heat treatment process. A particularly preferred temperature range for heat treatment of tantalum powder is between about 1250° to about 1450° C. (about 1523° K. to about 1723° K.). For tantalum anodes, preferred heat treatment ranges between about 1300° to about 1550° C. (about 1573° K. to about 1823° K.).

The following examples are provided to further illustrate the invention. The examples are intended to be illustrative in nature and are not to be construed as limiting of the scope of the invention.

PROCEDURE FOR CAPACITANCE, DIRECT CURRENT LEAKAGE, DETERMINATION (A) Pellet Fabrication:

The tantalum powder was compressed in a commercial pellet press without the aid of binders. Typically, the pressed density was 6.0 g/cc using a powder weight of 1.2 g and a diameter of 6.4 mm.

(B) Vacuum Sintering

The compacted pellets were sintered in a high vacuum of less than $10^{-5}$ torr (0.00133 Pa) for 30 minutes (1800 seconds) at temperatures in excess of 1500° C. (1773° K.).

(C) Anodization

The sintered pellets were anodized in a forming bath at 90±2° C. (363±2° K.) at 100 V DC. The electrolyte was 0.1% phosphoric acid.

The anodization rate was controlled to be 1 volt per minute. After a period of 3 hours ($1.08 \times 10^4$ seconds) at 100 V DC, the pellets were washed and dried.

(D) Testing Conditions

The anodes, after anodizing, rinsing, and drying, were first tested for direct current leakage (DCL). A phosphoric acid solution was employed. The anodes were immersed in the test solution to the top of the anode and the proper voltage was applied for 2 minutes (120 seconds), after which the DCL was measured.

After DCL measurements were completed the anodes formed to 200 volts were placed in a tray containing 10% phosphoric acid and permitted to soak 30 to 45 minutes (1800 to 2700 seconds).

The anodes formed to 270 volts were washed for 3 to 5 minutes (180 to 300 seconds) at 105°±5° C. (378±5° K.) in air. They were then soaked in 10% phosphoric acid for 30 to 45 minutes (1800 to 2700 seconds).

The capacitance was measured on the anode immersed in 10% phosphoric acid at 21° C. (294° K.) employing a type 1611B General Radio Capacitance Test Bridge with an a.c. signal of 0.5 volts and a d.c. bias of 3 volts.

PROCEDURE FOR PELLET STRENGTH DETERMINATION (A) Anode Fabrication

The tantalum powder was compressed in a commercial pellet press without the aid of binders. The pressed density was 6.0 g/cc using a powder weight of 1.6 g and a diameter and length of 6.4 mm and 8.4 mm, respectively.

(B) Testing

The cylindrical pellet is placed between two flat plates with its longitudinal axis parallel to the plates; a steadily increasing force is applied to one of the plates until the pellet breaks. The force at the point of breakage is recorded as the Crush Strength. The anode diameter size is measured before and after sintering; the percentage difference is recorded as Shrinkage.

Oxygen Analysis

The oxygen analysis is made using the Leco TC-30 $O_2$ and $N_2$ analyzer which is an inert gas fusion technique.

BET Surface Area

The total surface area of the tantalum is measured using a Numinco Orr surface area pore volume analyzer (manufactured by Numec Corporation). The BET (Brunauer-Emmet-Teller) surface areas obtained in this manner include the external surface area as well as the internal surface area contributed by the presence of pores.

EXAMPLE 1

A six level (2 cm spacing between levels) tantalum rig was employed to support the test samples as they were treated. The rig was arranged such that the top shelf held a sintered tantalum pellet which served as a target for optical pyrometer readings. 70 g of −60 mesh tantalum powder containing 1340 ppm $O_2$ was evenly divided and then spread onto two tantalum trays (1 cm×4 cm×5 cm). These two trays (Samples A and B) were then positioned on the second and third shelves from the top of the rig. A third tantalum tray was covered with a sheet of zirconium (5×5 cm) and positioned onto the fourth shelf below the trays of tantalum powder.

The rig, which held the tantalum trays, was then lowered inside the vacuum furnace so that it was surrounded by the cylindrical tantalum heating element and shielding. A set of tantalum heat shields was then placed on top of the heating elements so that the tantalum rig holding the trays was totally enclosed to insure a uniform temperature inside the furnace hot zone. The furnace was then closed and vacuum pulled to 1 micron and a furnace leak rate determined. A leak rate of less than 0.5 micron over a 5 minute (300 seconds) period was considered acceptable as measured by a McLeod gauge. Power was then turned on to the furnace and the tantalum powder heated under vacuum to 1000° to 1050° C. (1273° to 1323° K.) over a 15 minute (900 seconds) period. Heat up rates were controlled by increasing the furnace amperage at two minute intervals until the required amperage (usually 1400 amps) was sufficient to reach 1000° to 1050° C. (1273° to 1323° K.). Temperature readings were taken visually using an optical pyrometer by sighting directly onto the tantalum pellet located on the top shelf.

The tantalum powder began to out-gas at approximately 800° C. as evidenced by an increase in furnace pressure, which was monitored by a Varian vacuum gauge in the furnace foreline. Furnace pressure typically increased to approximately 70 micron. By the time 1050° C. (1323° K.) was reached, furnace pressure had started to decrease. 1050° C. (1323° K.) was then held for 30 minutes (1800 seconds), which allowed the furnace pressure to decrease to 40–60 micron as measured in the furnace foreline. It was noted that the McLeod gauge never showed a pressure increase above 0.5 micron.

After the 1050° C. (1323° K.) hold cycle was completed, the furnace temperature was gradually increased.

At the approximately 1200° C. (1473° K.) the furnace vacuum valves were closed thereby isolating the furnace interior. The furnace interior was then backfilled to 10 mm pressure with $H_2$. The furnace temperature was increased to 1250° C. (1523° K.) and held at 1250° C. (1523° K.) for 4 hours ($1.44 \times 10^4$ seconds) under the $H_2$ pressure.

When the 4 hour ($1.44 \times 10^4$ seconds) hold time was completed, the furnace temperature was increased to 1450° C. (1723° K.) over a 5 minute period (300 seconds). 1450° C. (1723° K.) was then maintained for 1 hour (3600 seconds) with the furnace still at 10 mm $H_2$ pressure. When the 1450° C. (1723° K.) hold cycle was completed, the furnace was evacuated to 0.5 micron and the tantalum powder cooled to room temperature under vacuum.

The deoxidized tantalum powder from each tray was processed separately to $-40$ mesh and chemically analyzed. The $-40$ mesh tantalum from each tray was then combined and chemically analyzed a second time.

Deoxidation Run Conditions:

30 Minutes (1800 seconds) at 1050° C. (1323° K.) @ vacuum, 4 Hour ($1.44 \times 10^4$ seconds) at 1250° C. (1523° K.) @ 10 mm $H_2$ 1250°–1450° C. (1523°–1723° K.) @ 10 mm $H_2$, 1 Hour (3600 seconds) at 1450° C. (1723° K.) @ 10 mm $H_2$.

Chemical analysis showed the following:

Tantalum powder initial $O_2$ content 1340 ppm. Following deoxidation:

| | $O_2$ |
|---|---|
| Sample A | 1085 ppm |
| Sample B | 1095 ppm |
| Composite of Sample A and Sample B | 1095 ppm |

The deoxidation treatment applied to Samples A and B resulted in a significant decrease in the powder $O_2$ content. Standard vacuum heat treatment of the same tantalum powder resulted in increasing the powder $O_2$ content by 300–500 ppm.

EXAMPLE 2

70 g of tantalum powder (the same feedstock as used in Example 1) was deoxidized with $H_2$ gas in the presence of zirconium strip. The procedure used for loading the furnace rig and leak checking the furnace was the same as used in Example 1. The tantalum powder was heated under vacuum to 1050° C. (1323° K.) and held for 30 minutes (1800 seconds) until the powder outgassing was completed and the furnace pressure had decreased to 40–60 micron as measured in the furnace foreline.

After the outgassing cycle was completed and at 1050° C. (1323° K.), the furnace vacuum valves were closed and the furnace backfilled to 10 mm pressure with $H_2$. The furnace temperature was then increased to 1250° C. (1523° K.) over a 9 minute (540 seconds) period. When 1250° C. (1523° K.) was reached, this temperature was held for 4 hours ($1.44 \times 10^4$ seconds). When the 4 hour ($1.44 \times 10^4$ seconds) hold time was completed, the furnace was evacuated to 0.5 micron. The furnace temperature was then increased to 1450° C. (1723° K.) and held at this temperature for 30 minutes (1800 seconds). When the 1450° C. (1723° K.) cycle was completed, furnace power was turned off and the tantalum powder cooled to room temperature under vacuum. The tantalum powder was processed the same way as in Example 1.

Deoxidation Run Conditions:

30 minutes (1800 seconds) at 1050° C. (1323° K.) @ vacuum, 4 Hour ($1.44 \times 10^4$ seconds) at 1250° C. (1523° K.) @ 10 mm $H_2$ 1250°–1450° C. (1523°–1723° K.) @ vacuum, 30 minutes (1800 seconds) at 1450° C. (1723° K.) @ vacuum.

Chemical analysis showed the following:

Tantalum powder initial $O_2$ content 1340 ppm. Following deoxidation:

| | $O_2$ |
|---|---|
| Sample C | 1310 ppm |
| Sample D | 1335 ppm |
| Composite of Sample C and Sample D | 1355 ppm |

The deoxidation treatment of Samples C and D accomplished the prevention of $O_2$ pickup by the Ta powders. Similar heat treatment of the same Ta powders using standard vacuum conditions resulted in increasing the $O_2$ content of the powder by 300–500 ppm.

EXAMPLE 3

70 g of tantalum powder (the same feedstock as used in Example 1) was deoxidized with $H_2$ gas in the presence of titanium strip as a gettering agent. The procedure used for loading the furnace rig and leak checking the furnace was the same as used in Example 1.

The tantalum powder was heated under vacuum to 1050° C. (1323° K.) and held for 30 minutes (1800 seconds) under vacuum until the powder outgassing was completed. At 1055° C. (1328° K.), the furnace vacuum valves were closed and the furnace backfilled to 10 mm pressure with $H_2$. The furnace temperature was increased to 1250° C. (1523° K.) over a 9 minute (540 seconds) period. When 1250° C. (1523° K.) was reached, this temperature was held for 2 hours (7200 seconds). When the 2 hour (7200 seconds) hold time was completed, the furnace was evacuated to 0.5 micron. The furnace temperature was then increased to 1450° C. (1723° K.) and held at this temperature for 30 minutes (1800 seconds). When the 1450° C. (1723° K.) cycle was completed, the furnace power was turned off and the tantalum powder cooled to room temperature under vacuum. The tantalum powder was processed the same was as in Example 1.

Deoxidation Run Conditions:

30 minutes (1800 seconds) at 1050° C. (1323° K.) @ vacuum, 2 Hour ($1.44 \times 10^4$ seconds) at 1250° C. (1523° K.) @ 10 mm $H_2$, 1250°–1450° C. (1523°–1723° K.) @ vacuum, 30 minutes (1800 seconds) at 1450° C. (1723° K.) @ vacuum.
Chemical analysis showed the following:
Tantalum powder initial $O_2$ content 1340 ppm.
Following deoxidation:

|  | $O_2$ |
| --- | --- |
| Sample E | 1425 ppm |
| Sample F | 1445 ppm |
| Composite of Sample E and Sample F | 1455 ppm |

Deoxidation treatment of Samples E and F resulted in mineral $O_2$ pickup as compared with an $O_2$ pickup of 300 to 500 ppm under standard vacuum heat treatment conditions.

EXAMPLE 4

70 g of −60 mesh tantalum powder containing 1625 ppm $O_2$ was deoxidized with $H_2$ gas in the presence of zirconium strip as the gettering agent. The procedure used for loading the furnace rig and leak checking the furnace was the same as used in Example 1. The tantalum powder was heated under vacuum to 900° C. (1173° K.) and held at this temperature until evidence of outgassing was complete. At 1160° C. (1433° K.) the furnace vacuum valves were closed and the furnace backfilled to 10 mm pressure with $H^2$. The furnace temperature was increased to 1250° C. in 6 minutes (360 seconds). At 1250° C. (1523° K.) the furnace temperature was gradually increased over a period of 1 hour (3600 minutes) to 1450° C. (1723° K.). When 1450° C. (1723° K.) was reached, the furnace was evacuated to 0.5 micron and furnace power turned off. The tantalum powder was cooled to room temperature under vacuum and processed the same way as in Example 1.
Deoxidation Run Conditions:
Vacuum degass powder at 900°–1000° C. (1173°–1273° K.) @ vacuum, 1 Hour (3600 seconds) heat rate 1250°–1450° C. (1523°–1723° K.) @ 10 mm $H_2$.
Chemical analysis showed the following:
Tantalum powder initial $O_2$ content 1625 ppm.
Following deoxidation:

|  | $O_2$ |
| --- | --- |
| Sample G | 1630 ppm |
| Sample H | 1635 ppm |
| Composite of Sample G and H | 1640 ppm |

Deoxidation heat treatment of Samples G and H resulted in the powder $O_2$ content remaining essentially unchanged. Standard vacuum heat treating of this high surface powder resulted in an $O_2$ pickup of from 300–500 ppm.

EXAMPLE 5

70 g of tantalum powder (the same feedstock as used in Example 4) was deoxidized with $H_2$ in the presence of titanium strip as a gettering agent. The procedure used for loading the furnace rig and leak checking the furnace was the same as used in Example 1. The tantalum powder was heated under vacuum to 900° C. (1173° K.) and held at this temperature until evidence of outgassing was complete. At 1200° C. (1473° K.) and held at this temperature until evidence of outgassing was complete. At 1200° C. (1473° K.) the furnace vacuum valves were closed and the furnace backfilled to 10 mm pressure with $H_2$. At 1250° C. (1523° K.), the furnace temperature was gradually increased over a 3 hour (1.08×10⁴ seconds) period to 1450° C. (1723° K.). When 1450° C. (1723° K.) was reached, the furnace was evacuated to 0.5 micron and furnace power turned off. The tantalum powder was cooled to room temperature under vacuum and processed to −40 mesh. The tantalum powder of Samples I and J was combined and chemically analyzed.
Deoxidation Run Conditions:
Vacuum degass powder at 900°–1000° C. (1173°–1273° K.), 3 Hour (1.08×10⁴ seconds) heat rate 1250°–1450° C. (1523°–1723° K.) @ 10 mm $H_2$.
Chemical analysis showed the following:
Tantalum powder initial $O_2$ content 1625 ppm.

|  | $O_2$ |
| --- | --- |
| Composite of Sample I and Sample J | 1370 ppm |

Deoxidation conditions including a time extension of the 1250°–1450° C. (1523°–1723° K.) temperature ramp resulted in a further decrease of the tantalum powders $O_2$ content.

EXAMPLE 6

60 g of tantalum powder (the same feedstock as used in Example 4) was deoxidized with $H_2$ gas in the presence of titanium sponge as a gettering agent. The titanium sponge was vacuum degassed at 800° C. (1073° K.) in a separate furnace run prior to its use as a gettering agent. The procedure used for deoxidizing the tantalum powder, i.e., loading the furnace rig and leak checking the furnace was the same as used in Example 1 except the titanium sponge was used instead of titanium strip. The tantalum powder was heated under vacuum to 900° C. 1173° K.) and held at this temperature until evidence of outgassing was complete. At 1150° C. (1423° K.) the furnace vacuum valves were closed and the furnace backfilled to 10 mm pressure with $H_2$. At 1250° C. (1523° K.), the furnace temperature was gradually increased over a 3 hour (1.08×10⁴ seconds) period to 1450° C. (1723° K.). When 1450° C. (1723° K.) was reached, this temperature was held for an additional hour (3600 seconds). When the 1 hour (3600 seconds) hold time was completed, the furnace was evacuated to 0.5 micron and furnace power turned off. The tantalum powder was cooled to room temperature under vacuum and processed to −40 mesh. The tantalum powder of Sample K and L was combined and chemically analyzed.
Deoxidation Run Conditions:
Vacuum degass at 900°–1000° C. (1173°–1273° K.), 3 Hour (1.08×10⁴ seconds) heat rate 1250°–1450° C. (1523°–1723° K.) @10 mm $H_2$, 1 Hour (3600 seconds) at 1450° C. (1723° K.) @ 10 mm $H_2$.
Chemical analysis showed the following:
Tantalum powder initial $O_2$ content 1625 ppm.

|  | $O_2$ |
| --- | --- |
| Composite of Sample K and Sample L | 1430 ppm |

Titanium sponge was shown to be an effective gettering agent, as part of the subject deoxidation mechanism for treating tantalum powder.

EXAMPLE 7

To demonstrate the effectiveness of the present deoxidation process in treating tantalum after it has been formed into anodes, two samples of tantalum powder was compressed into pellets in a commercial pellet press. One set of these anode pellets was then sintered under standard high vacuum of $10^{-3}$ torr (0.133 Pa) for 30 minutes (1800 seconds) at temperatures in excess of 1500° C. (1773° K.). A second set of anodes was then sintered under 10 mm $H_2$ in the presence of Zr metal. As shown in the following table, oxygen content decrease was accomplished during the anode sintering, without significant effect on electrical properties, by using the treatment of the present invention, while a significant oxygen content increase was noted after standard sintering treatment under vacuum.

| | Tantalum Powder Initial $O_2$ 1580 ppm | | |
|---|---|---|---|
| | Control Vacuum Sinter Anodes | | Sample M $H_2$ Deoxidized Anodes |
| | 1560° C. (1833° K.) × 30 Minutes (1800 seconds) | 1650° C. (1923° K.) × 30 Minutes (1800 seconds) | 1560° C. (1833° K.) × 30 Minutes (1800 seconds) |
| Capacitance (uFV/g) | 12050 | 9220 | 9470 |
| DCL (nA/uFV) | 0.35 | 0.12 | 0.13 |
| % Diameter Shrinkage | 2.0 | 4.1 | 4.3 |
| Sintered Density | 5.1 | 5.7 | 5.5 |
| $O_2$ (ppm) | 1920 | 1925 | 1170 |
| $N_2$ (ppm) | 65 | 40 | 30 |

EXAMPLE 8

This example further illustrates that electrical properties of anodes are not adversely affected to any marked degree by deoxidation treatment being applied to the tantalum powder used to produce the anodes. Two samples of the same tantalum powder material (initial $O_2$ content 1280 ppm) were individually heat treated. The control sample was heat treated under standard vacuum conditions and then pressed into anodes and sintered. The other sample was heat treated using the deoxidizing process of the present invention and then pressed into anodes and sintered in the same manner as the control sample. As reported below, the control sample picked up 435 ppm $O_2$ during processing, while the sample processed according to the present invention showed an $O_2$ content increase of only 135 ppm.

| | Tantalum Powder Initial $O_2$ 1280 ppm | |
|---|---|---|
| | Control | Sample N |
| Heat Treatment | 1475° C. (1748° K.) × 30 minutes (1800 seconds) @ vacuum | 1250° C. (1523° K.) × 120 minutes (7200 seconds) under $H_2$ 1450° C. (1723° K.) × 30 minutes (1800 seconds) @ vacuum |
| $O_2$ Content (ppm) | 1715 | 1385 |
| Anode Preparation | Pressed to 6.25 g/cc sintered @ 1595° C. | Pressed to 6.25 g/cc sintered @ 1595° C. |
| Electrical Properties | (1868° K.) × 30 minutes (1800 seconds) | (1868° K.) × 30 minutes (1800 seconds) |
| Capacitance (uFV/g) | 10852 | 10760 |
| Diameter Shrinkage (%) | 2.6 | 2.6 |
| Direct Current Leakage (DCL) (nA/uFV) | 0.24 | 0.36 |
| Crush Strength (lbs) | >50 | 47 |
| BET Surface Area (m²/g) | 0.21 | 0.19 |

EXAMPLE 9

This example further demonstrates the effectiveness of deoxidizing tantalum powder after it has been formed into anodes. Two-hundred seventy-five (275) anodes (23 grams total weight), which represented four different anode groups of varying $O_2$ content, were placed into two tantalum trays and loaded into a vacuum furnace as previously described under Example 1. A piece of zirconium sheet, positioned on top of a third tantalum tray was also located inside the furnace hot zone per Example 1.

The tantalum anodes were heated under vacuum to 1200° C. (1473° K.). At 1200° C. (1473° K.), the furnace vacuum valves were closed and the furnace backfilled to 200 mm pressure with $H_2$. The furnace temperature was then increased to 1500° C. (1773° K.) over a 9 minute (540 seconds) period. When 1500° C. (1773° K.) was reached, this temperature was held for 60 minutes (3600 seconds). When the 1500° C. (1773° K.) cycle was completed, the furnace power was turned off and the tantalum anodes cooled to room temperature under vacuum. Chemical analysis of the anodes before and after deoxidation is shown below:

| Anode Group No. | Initial $O_2$ Level (ppm) | Deoxidized $O_2$ Level (ppm) |
|---|---|---|
| 2 | 2200 | 1115 |
| 4 | 2200 | 895 |
| 5 | 2800 | 895 |
| 8 | 3600 | 1040 |

EXAMPLE 10

A similar experiment as described in Example 9 was also run at 1400° C. (1673° K.) for 60 minutes (3600 seconds) at 20 mm $H_2$ in the presence of Zr sheet. Similar reductions in the anode $O_2$ content were also accomplished as shown below:

| Anode Group No. | Initial $O_2$ Level (ppm) | Deoxidized $O_2$ Level (ppm) |
|---|---|---|
| 2 | 2200 | 1345 |
| 4 | 2200 | 935 |
| 5 | 2800 | 955 |
| 8 | 3600 | 955 |

EXAMPLE 11

Three pounds of tantalum hydride powder were evenly distributed into three tantalum trays and loaded into a vacuum furnace which also contained Zr metal as a gettering agent. The tantalum hydride, which contained 1140 ppm $O_2$, was heated under vacuum to 1000° C. (1273° K.) to allow the chemically bound $H_2$ to be removed. When this was accomplished as evidenced by no further outgassing of the tantalum powder, the furnace temperature was increased to 1200° C. (1473° K.). At 1200° C. (1473°), the furnace vacuum valves were closed and the furnace chamber backfilled to 20 mm $H_2$ pressure. The furnace temperature was allowed to increase to 1250° C. (1523° K.) and held at this temperature for 60 minutes (3600 seconds). When the 60 minute (3600 seconds) hold cycle was completed, vacuum was pulled on the furnace chamber to remove the $H_2$ gas and power to the furnace elements turned off. The furnace was then backfilled with argon gas to allow the furnace chamber and tantalum powder to reach room temperature.

The surface of the tantalum powder located in each tray was removed and analyzed separately from the bulk of the remaining tantalum powder. Analysis of the powder surface and bulk samples is shown.

| Bulk | Deoxidized $O_2$ (ppm) |
|---|---|
| Tray 1 | 1140 |
| Tray 2 | 1185 |
| Tray 3 | 1155 |
| Surface Composite | 1145 |

The above deoxidized powder was then given a second deoxidation treatment at 1450° C. (1723° K.)×60 minutes (3600 seconds) at 20 mm $H_2$. The tantalum powder was loaded into the furnace along with Zr metal as previously described. The powder was heated to 1250° C. (1523° K.) under vacuum. At 1250° C. (1523° K.) the furnace chamber was isolated and backfilled to 20 mm $H_2$. The furnace temperature was then increased to 1450° C. (1723° K.) and held at temperature for 60 minutes (3600 seconds). The tantalum powder surface was sampled and analyzed as well as the bulk powder from each tray.

| Bulk | Deoxidized $O_2$ (ppm) |
|---|---|
| Tray 1 | 1495 |
| Tray 2 | 1340 |
| Tray 3 | 1340 |
| Surface Composite | 1075 |

The data showed that a double heat treatment of tantalum powder in the presence of $H_2$ gas and a metallic gettering agent helped control the increase in the powders $O_2$ content.

EXAMPLE 12

As a further example of $O_2$ control during the heat treating of tantalum powder, a comparison was made between heat treating the same tantalum powder under vacuum vs. $H_2$ deoxidation. Approximately 100 g of tantalum powder originally containing 950 ppm $O_2$ was vacuum heat treated at 1100° C. (1373° K.) for 6 hours (2.16×10$^4$ seconds) duration. Chemical analysis of the powder showed that its $O_2$ content increased to 1535 ppm $O_2$. The same type and quantity of tantalum powder was also heat treated at 1100° C. (1373° K.) for 6 hours (2.16×10$^4$ seconds) at 200 mm $H_2$ pressure and in the presence of approximately 10 g Zr strip. This tantalum powder showed a lower $O_2$ increase to 1360–1410 ppm, indicating that $O_2$ increases were reduced due to the $H_2$ deoxidation conditions.

The embodiments of the invention in which an exclusive property of privilege is claimed are defined as follows:

1. A process for the reduction of oxygen content in tantalum and/or columbium material comprising heating said material at a temperature ranging from about 900° to about 2400° C. (about 1173° to about 2673° K.) under a hydrogen-containing atmosphere in the presence of an oxygen-active metal selected from the group consisting of beryllium, calcium, cerium, hafnium, lanthanum, lithium, praseodymium, scandium, thorium, titanium, uranium, vanadium, yttrium, zirconium, alloys and mixtures thereof.

2. The process of claim 1 wherein the tantalum and/or columbium material is heated at a temperature ranging from about 1100° to about 2000° C. (about 1373° to about 2273° K.).

3. The process of claim 1 wherein the oxygen-active metal is titanium, zirconium, or mixtures thereof.

4. The process of claim 1 wherein the tantalum material is a tantalum powder.

5. The process of claim 4 wherein the tantalum powder is heated at a temperature ranging from about 1250° to about 1450° C. (about 1523° to about 1723° K.).

6. The process of claim 1 wherein the tantalum material is in the form of tantalum anodes.

7. The process of claim 6 wherein the tantalum anodes are heated at a temperature ranging from about 1300° to about 1550° C.

* * * * *